(12) United States Patent
Mendoza et al.

(10) Patent No.: US 6,454,091 B1
(45) Date of Patent: Sep. 24, 2002

(54) STORAGE CASE FOR DVD'S AND COMPACT DISCS

(76) Inventors: Christopher S. Mendoza, 7365 Viscaya Cir., Margate, FL (US) 33063; Carlos Robaina, 4529 NW. 60 Ct., Coconut Creek, FL (US) 33073

( * ) Notice: Subject to any disclaimer, the term of this patent is extended or adjusted under 35 U.S.C. 154(b) by 0 days.

(21) Appl. No.: 09/912,138

(22) Filed: Jul. 24, 2001

(51) Int. Cl.[7] .............................................. B65D 85/57
(52) U.S. Cl. ..................... 206/308.1; 206/310; 206/493
(58) Field of Search ............................. 206/308.1, 309, 206/310–312, 493, 303

(56) References Cited

U.S. PATENT DOCUMENTS

| | | | | |
|---|---|---|---|---|
| 5,505,299 A | * | 4/1996 | Ditzig et al. | 206/1.5 |
| 5,938,020 A | * | 8/1999 | Luckow | 206/308.1 |
| 6,196,384 B1 | * | 3/2001 | Belden, Jr. | 206/308.1 |
| 6,364,107 B1 | * | 4/2002 | Flores et al. | 206/308.1 |

* cited by examiner

Primary Examiner—Shian Luong
(74) Attorney, Agent, or Firm—Robert M. Downey, P.A.

(57) ABSTRACT

A storage case for protectively containing media discs, such as DVD's and CD's, provides a disc holder for releasably holding the media discs in the interior of the case between top and bottom hinged cover members. The disc holder includes a centrally disposed disc retainer having flexible fingers with barbed distal ends for engaging the upper surface of the media disc proximate a central opening thereof. Arm members extend between the fingers and a pair of diametrically opposed tabs, wherein application of a radially inward directed force to the tabs, using the thumb and one other finger of the same hand, serves to urge the fingers to a compressed position so that the barbed distal ends are freed from the disc. Sloped shoulders at the juncture of the arm members and the respective pair of tabs urge the disc upwardly and into the grasp of the user's thumb and other finger, upon application of the radially inward directed force to the tabs, thereby releasing the disc from the holder and directly into the grasp of the user with the use of just two fingers of one hand.

18 Claims, 4 Drawing Sheets

STORAGE CASE FOR DVD'S AND COMPACT DISCS

BACKGROUND OF THE INVENTION

1. Field of the Invention

The present invention relates to storage of media discs and, more particularly, to devices for holding and protectively enclosing DVD's, CD's and the like.

2. Discussion of the Related Art

Storage cases and protective containers for holding and protectively enclosing media discs, such as compact discs (CD's) and digitized video discs (DVD's), are well known in the art. Media disc containers of this nature typically have a central pedestal for supportively gripping the disc by engaging the central opening without contacting either side of the disc within data containing regions. In many instances, containers of this nature are further provided with a ledge for contacting portions of an outer perimeter of the disc for stabilizing the disc within the case so that it does not tip when supported on the pedestal. Usually, the disc is loaded into the container by lowering it onto the pedestal, while gripping opposite perimeter portions, and forcing the disc downwardly into engagement with the pedestal while simultaneously applying finger pressure against one or more elements of the pedestal. Removal of the disc is similarly affected by finger pressure against the pedestal and simultaneously lifting at the perimeter portions of the disc with the use of two additional fingers.

The well known disc holding structures of this nature present several problems. First, sufficient lifting force is required in order to effectively separate the disc from the pedestal holder. This results in undesirable bending of the disc when pulling upwardly on the outer perimeter portions as the central pedestal maintains a hold on the central portion of the disc. Second, the need to apply downward pressure on the pedestal with one finger, while lifting the outer perimeter of the disc with two other fingers requires significant dexterity, often demanding the use of two hands. This can be a particular problem when attempting to remove a media disc from its case while driving an automobile.

The present invention overcomes the problems associated with presently used media disc storage cases. Specifically, the storage case of the present invention provides a disc holder which is operable using just two fingers of a single hand to release the disc from the holder and simultaneously move the disc into the grasp of the user's two fingers so that the disc can be easily and conveniently removed from the case.

SUMMARY OF THE INVENTION

The invention is directed to a storage case with an integral disc holder for protectively containing media discs, such as DVD's and CD's. The disc holder is structured to releasably hold a media disc in the interior of the case, between top and bottom hinged cover members, and includes a centrally disposed disc retainer having flexible fingers with barbed distal ends for engaging the upper surface of the media disc proximate a central opening thereof. Arm members extend between the fingers and a pair of diametrically opposed tabs, wherein application of a radially inward directed force to the tabs, using the thumb and one other finger of the same hand, serves to urge the fingers to a compressed position so that the barbed distal ends are freed from the disc. Sloped shoulders at the juncture of the arm members and the respective pair of tabs urge the disc upwardly and into the grasp of the user's thumb and other finger, upon application of the radially inward directed force to the tabs, thereby releasing the disc from the holder and directly into the grasp of the user with the use of just two fingers of one hand.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

Figure 1:
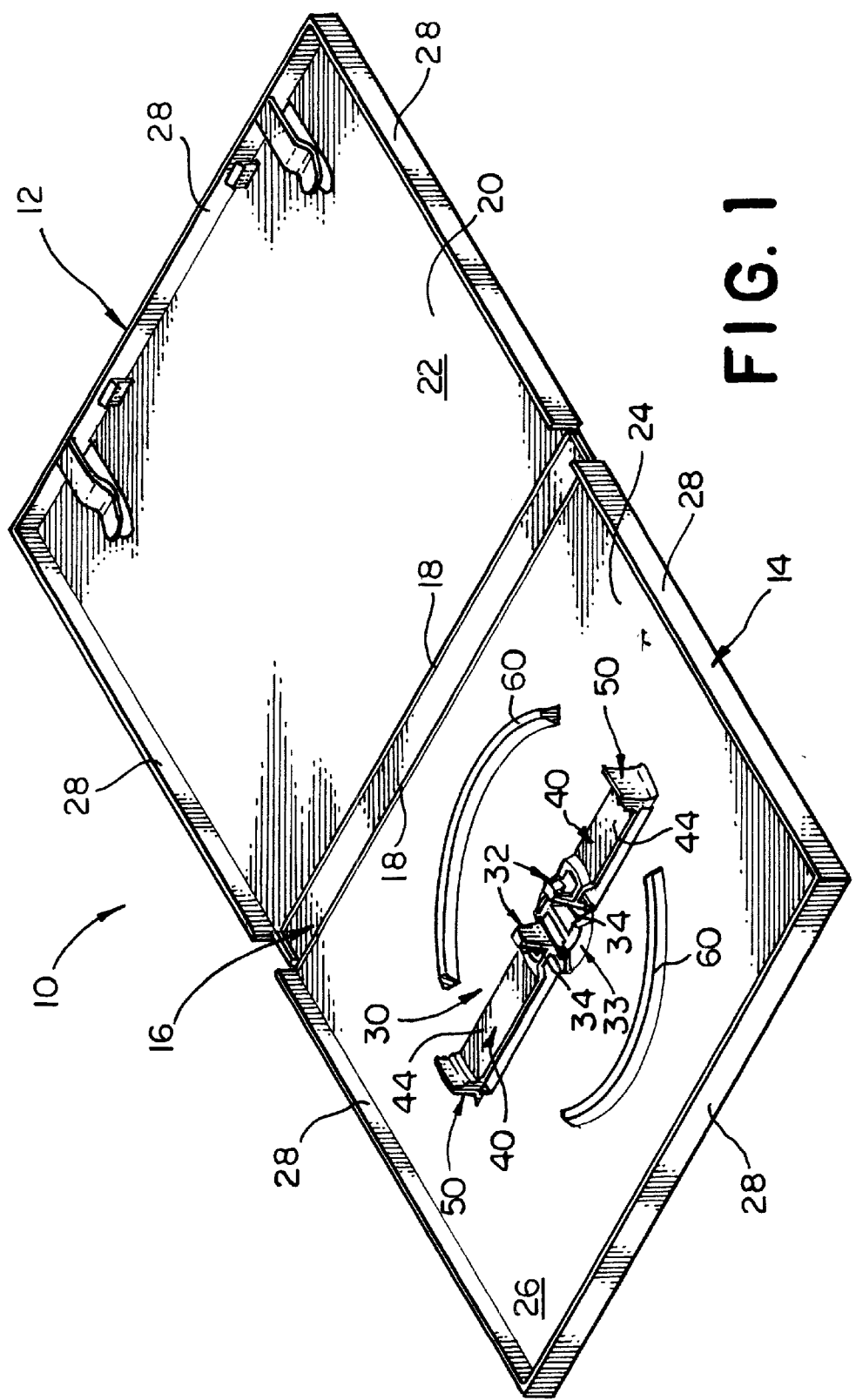
FIG. 1 is a top perspective view of the disc storage case of the present invention, in accordance with a preferred embodiment thereof.
Figure 2:
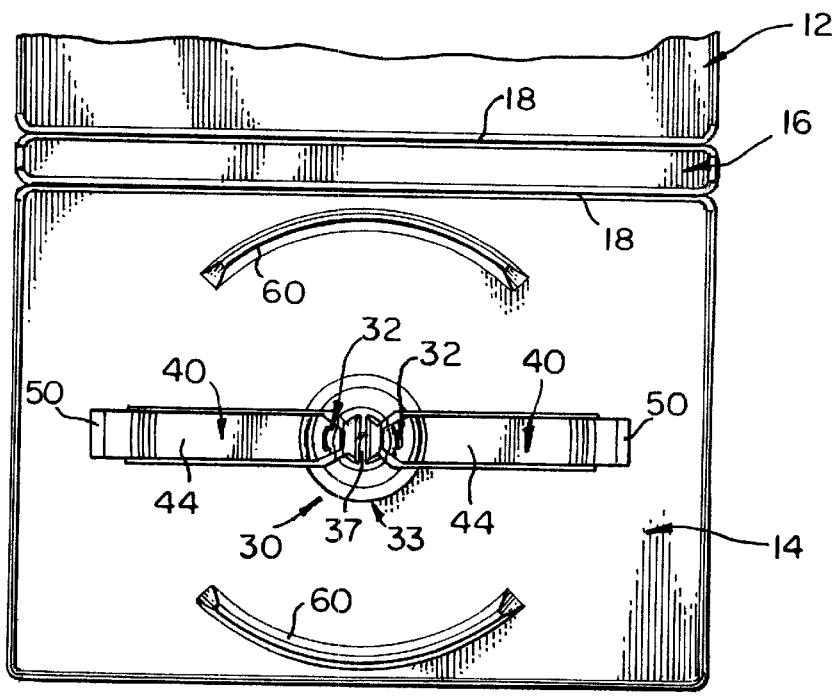
FIG. 2 is an isolated top plan view of an inner face of a base panel of the storage case showing a disc holder and reinforcing ribs thereon.
Figure 3:
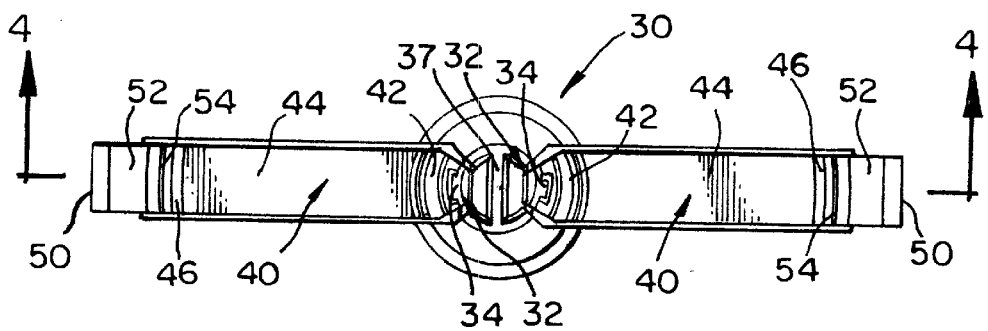
FIG. 3 is an isolated top plan view of the disc holder.
Figure 4:
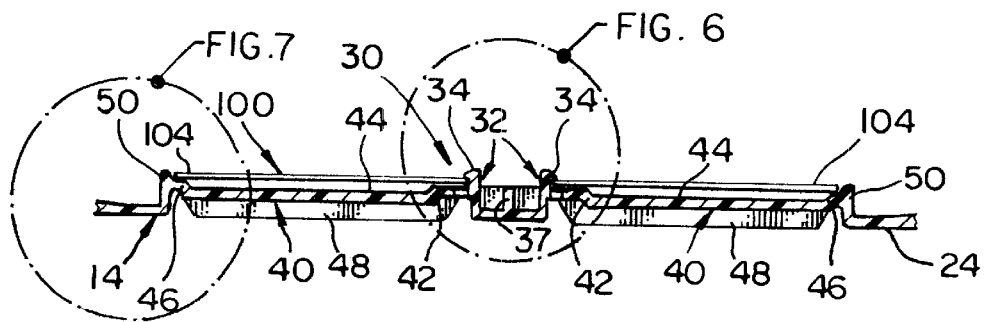
FIG. 4 is a cross sectional view of the disc holder, taken along the line indicated as 4—4 in FIG. 3.

DETAILED DESCRIPTION OF THE PREFERRED EMBODIMENT:

Referring to the several views of the drawings, and initially FIGS. 1 and 2, the disc storage case of the present invention is shown and is generally indicated as 10. The disc storage case 10 is particularly adapted for protectively storing media discs, such as DVD's and CD's. The storage case 10 includes a top cover 12 and a bottom cover 14 hingedly movable relative to one another about a central hinge spine 16. In the preferred embodiment, the case is integrally molded to provide living hinges 18 between the central hinge spine and the respective top and bottom covers 12, 14. The top cover includes a flat top panel 20 having an inner face 22 and an opposite outer face (not shown). The bottom cover 14 includes a base panel 24 having an inner face 26 and an opposite outer face 27. An integral lip 28 formed about the periphery of the side edges of the top and bottom covers 12, 14, provides a side wall of the storage case which serves to completely enclose the case interior when the top and bottom covers are secured in a closed position.

As seen throughout the several views of the drawings, the case 10 is provided with a disc holder, generally indicated as 30, for releasably securing a media disc 100 within the case interior. In the preferred embodiment, the disc holder 30 is integrally formed on the base panel 24 and protrudes upwardly from the inner face 26. It should be noted, however, that the disc holder 30 can be manufactured as a separate piece for insertion in the case and against the base panel and such an arrangement and structure is fully contemplated within the spirit and scope of the present invention. The disc holder 30 includes a central disc retainer 32 for releasably holding the media disc 100. A central hub 33 supports the disc retainer 32 and reinforces the base panel 24 at the location of the disc retainer. The central hub is defined by a raised structure including opposite curbs 35 and a transverse wall 37 integral with and spanning between the opposite curbs 35. The transverse wall 37 serves to provide rigidity to the base panel and disc retainer. More particularly, the central disc retainer 32 includes a pair of upwardly extending flexible fingers 34 which are flexibly connected to the opposite curbs 35 of the central hub 33 by link stems 41. The flexible fingers 34 are provided with barbed distal ends 36 for engaging the media discs 100 proximate a central hole 102 of the disc. Specifically, the barbed distal ends 36 are formed to include an angled top surface 38 to promote sliding passage and receipt of the barbed distal ends upwardly through the central hole 102, from an underside of the disc. Thus, to attach the media disc 100 to the disc holder 30, the barbed distal ends 36 are aligned with the central hole 102 of the disc 100 so that the angled top surfaces 38 of the barbed distal ends 36 engage the lower side of the disc 100, proximate the central hole 102. Then, upon application of downward pressure on the disc against the barbed distal ends 36, the angled top surfaces 38 are guided through the central hole 102 as the fingers 34 flex inwardly toward a center of the disc retainer 32. This permits the barbed distal ends 36 to pass through the central hole of the disc 100. Once the barbed distal ends are completely through the central hole 102, the flexible fingers 34 return to a relaxed position so that a retaining lip 39 on the underside of the barbed distal ends 36 engages an upper surface of the disc 100, proximate the central hole 102. It should be noted that the retaining lip 39 does not necessarily have to maintain engagement with the upper surface of the disc. Rather, the retaining lip 39 is maintained in blocking relation to the upper surface of the disc, about the periphery of the central hole 102, thereby preventing lifting and removal of the media disc 100 when the fingers are in the relaxed state.

Figure 5:
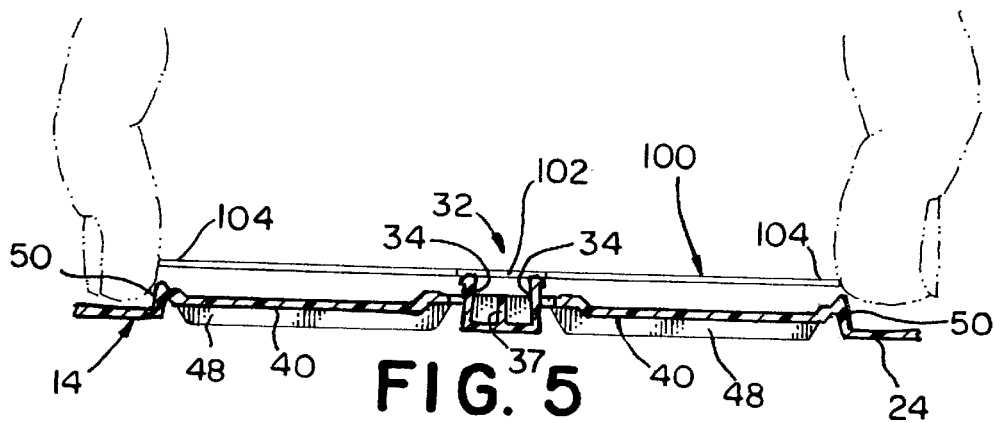
FIG. 5 is a cross sectional view of the disc holder illustrating actuation thereof with the use of two fingers to release a media disc from the holder and into the grasp of the user's two fingers.
Figure 6:
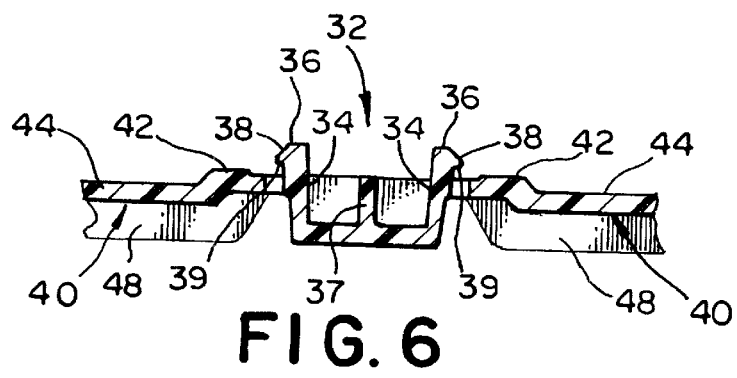
FIG. 6 is an isolated view taken from the area indicated in FIG. 4, shown in cross section, illustrating a central disc retainer including flexible retainer fingers and integral arm members extending therefrom.

The disc holder 30 further includes radial arm members 40 associated with each of the respective flexible fingers 34. More specifically, a pair of arm members 40 are each integrally attached to a side of a respective one of the flexible fingers 34 at an inboard end of the arm members. A central portion 44 of each arm member 40 extends radially outward to an outboard end portion 46. A pair of tabs 50 extend upwardly from the base panel 24 and are integrally joined with the outboard end portions of the respective arm members 40. The tabs 50 are diametrically opposed to one another and are spaced apart a distance slightly greater than the diameter of the disc 100. The outer facing sides of the tabs 50 are specifically structured for application of pressure, using the fingers, to exert a radially inward directed force, transmitted through the arm members 40 to the flexible fingers 34. This serves to urge the flexible fingers inwardly to the compressed state, as seen in FIG. 5, in order to release the barbed distal ends from blocking engagement with the upper side of the disc 100 so that the barbed distal ends can be received through the central hole 102. Specifically, upon application of the inward force on the fingers 34, a twisting force is imparted on the link stems 41. Twisting of the link stems 41 allows the fingers to flex inwardly toward the center of the disc retainer. Longitudinal ribs 48 are integrally formed on the underside of the arm members 40 to provide stiffening and to thereby discourage bowing of the arm members 40 upon application of the inwardly directed force. It is important to note that the tabs 50 are specifically structured and arranged for operating the disc holder 30 with the use of one hand by applying pressure with the thumb on one tab and one other finger (e.g. the index finger or middle finger) on the other tab. Thus, the tabs 50 are essentially pinched between the thumb and one other finger of a single hand of the user, to apply the radially inward directed force in order to move the flexible retainer fingers 34 to the compressed position.

Figure 7:
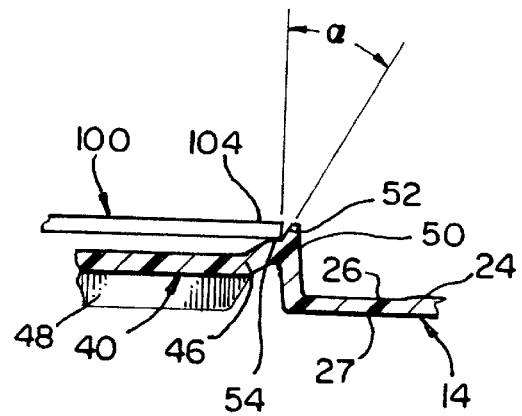
FIG. 7 is an isolated view taken from the area indicated in FIG. 4, shown in cross section, illustrating a finger actuated tab of the disc holder and an outboard end portion of an arm member integrally formed therewith, with an outer periphery of a media disc resting on a ledge at the outboard end of the arm member.
Figure 8:
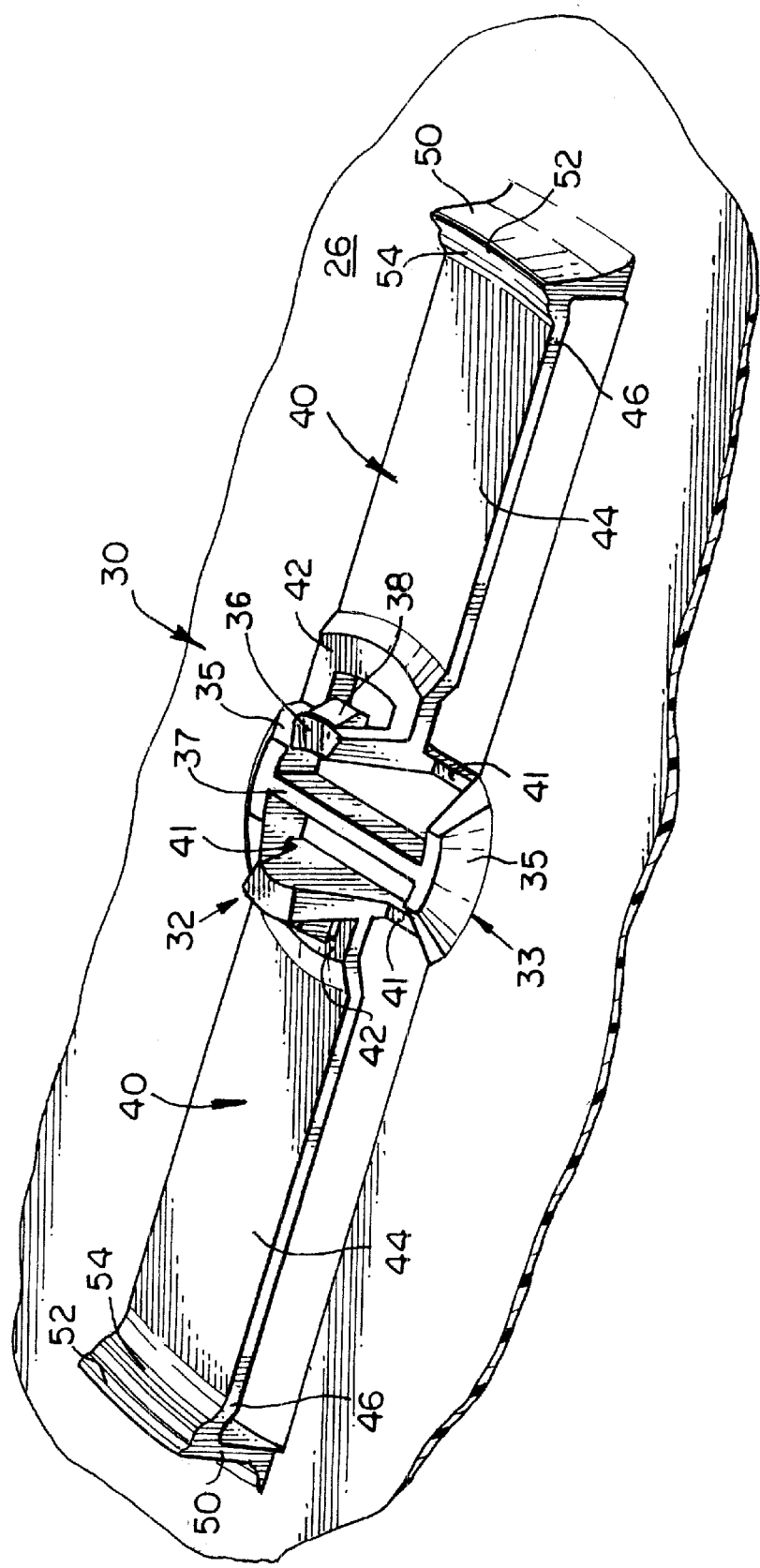
FIG. 8 is an isolated perspective view of the disc holder.

A disc seat 42 is formed at the juncture of the arm members 40 with the respective flexible retainer fingers 34 radially outboard of the central disc retainer 32. The disc seat 42 is specifically structured and disposed for supporting engagement with a lower surface of the media disc 100, proximate the central hole 102 when the media disc 100 is attached to the disc holder. As seen in FIG. 7, the disc holder 30 is further provided with a disc supporting ledge 54 formed at the juncture of the outboard end portion 46 of each arm member 40 and the respective tabs 50. The ledge 54 is positioned and disposed for supporting engagement with the lower surface of the media disc 100 at the outer periphery 104 of the disc. Thus, when the media disc 100 is attached to the disc holder 30, the disc seat 42 and supporting ledge 54 serve to support and maintain the disc 100 in a stable, level position which is spaced above, and generally parallel to the inner face 26 of the base panel 24.

As seen in FIG. 7, the disc holder 30 is further provided with sloped shoulders 52 extending upwardly from the ledge 54 to a top distal end of each tab 50 at an angle "a" which is greater than 90 degrees relative to the ledge 54. The sloped shoulders 52, adjacent to each tab 50, are specifically structured for engagement with a lower outer peripheral edge of the media disc 100 upon application of the radially inward directed force to the tabs 50 in order to urge the disc upwardly and off of the disc holder 30. Accordingly, upon application of the radially inward directed force by pinching the tabs 50 between the thumb and one other finger of the same hand, each sloped shoulder 52 is forced against the lower outer peripheral edge of the disc, causing the disc to ride up the sloped shoulders 52 until the outer peripheral edge of the disc is received in the grasp of the operator's fingers, as seen in FIG. 5. Simultaneously, the flexible retainer fingers 34 are urged inwardly to the compressed position, thereby releasing the retaining lips 39 from captivating engagement with the upper surface of the disc 100 and allowing the barbed ends 36 of the flexible fingers 34, including the retaining lips 39, to pass through the central hole 102 of the disc 100 as the disc separates from the retainer 32 and rises up and into the grasp of the user's fingers.

The base panel 24 of the bottom cover 14 may be provided with arcuate ribs 60, raised above the inner side surface 26 and spaced radially outward of the disc holder 30, for providing rigidity so that the bottom cover does not easily bend or flex. The arcuate ribs 60 further provide a means for visually guiding the disc 100 onto the disc holder 30.

While the present invention has been shown and described in accordance with a preferred and practical embodiment thereof, it is recognized that departures from the instant disclosure are contemplated within the spirit and scope of the present invention, as set forth in the following claims and as interpreted under the doctrine of equivalents.

What is claimed is:

1. A storage case for protectively containing a disc therein, wherein the disc includes a central opening, an outer periphery and upper and lower surfaces, the storage case comprising:

a top cover including a top panel;

a bottom cover including a base panel with an inner face;

hinge means for allowing hinged movement of said top and bottom covers relative to one another between an open position and a closed position to enclose an interior storage area of the case;

disc holder means on said base panel for releasably holding the disc within the interior storage area, said disc holder means comprising:

a pair of finger actuated tabs extending upwardly from said inner face of said base panel in diametrically opposing relation to one another and said tabs being structured to receive a radially inward directed force applied by the thumb and one other finger of the same hand of a user, wherein the thumb engages a first one of said pair of tabs and the other finger engages a second one of said pair of tabs;

disc retainer means positioned and disposed between said tabs for releasably holding the disc and including a plurality of flexible fingers extending upwardly from said inner face of said base panel and terminating at barbed distal ends, said barbed distal ends each having a retaining lip for engaging the upper surface of the disc proximate the central opening when said plurality of fingers are in a relaxed position, and said plurality of fingers being structured and disposed to flex radially inward from said relaxed position to a compressed position to remove said retaining lip from the disc and to permit passage of said barbed distal ends through the central opening of the disc;

arm members extending between each of said tabs and said plurality of fingers for transmitting the radially inward directed force to said plurality of fingers to urge said plurality of fingers to said compressed position; and means for urging the disc upward relative to said base panel upon applying said radially inward directed force to said pair of tabs so that said barbed distal ends of said plurality of fingers pass through the central opening and the periphery of the disc moves into grasped engagement between the thumb and the other finger of the user, thereby releasing the disc from said disc holder means and into the grasp of the user.

2. The storage case as recited in claim 1 wherein said barbed distal ends of said plurality of flexible fingers each include an angled top surface structured and disposed to promote sliding passage of said barbed distal ends through the central opening of the disc upon attaching the disc to said disc holder means by forcing the central opening downwardly against said top angled surfaces of said barbed distal ends, thereby causing said plurality of flexible fingers to flex inwardly to said compressed position.

3. The storage case as recited in claim 2 wherein said arm members each include an outboard portion and an opposite inboard portion.

4. The storage case as recited in claim 3 further including a disc seat formed on said inboard portions of said arm members adjacent to and radially outboard of said plurality of flexible fingers, said disc seat being structured and disposed to support the lower surface of the disc proximate to the central opening when the disc is attached to said disc holder means.

5. The storage case as recited in claim 4 wherein said means for urging the disc upward includes a sloped shoulder adjacent to said outboard portion of each of said arm members at a juncture of said arm members and each of said tabs, respectively, said sloped shoulder being structured and disposed for sliding engagement with the lower surface of the disc at the outer periphery thereof upon application of said radially inward directed force to said tabs, resulting in the outer periphery of the disc riding up said sloped shoulder adjacent to each of said tabs and into the grasp of the thumb and the one other finger of the user.

6. The storage case as recited in claim 5 further comprising a ledge formed on said outboard portion of said arm members for supporting the lower surface of the disc proximate the outer periphery when the disc is attached to said disc holder means.

7. The storage case as recited in claim 6 further comprising a plurality of arcuate rib members integrally formed with said base panel and protruding upwardly from said inner face, said arcuate rib members being structured and disposed to reinforce said bottom cover by providing increased rigidity to said base panel, thereby discouraging bending and flexing of said base panel.

8. The storage case as recited in claim 7 further comprising a lip formed about an outer periphery of said top and bottom covers to define a side wall of said case which, in conjunction with said top panel, said base panel and said hinge means, encloses said interior storage area when said top and bottom covers are in said closed position.

9. The storage case as recited in claim 8 wherein said top cover, said bottom cover, said hinge means, said lip and said disc holder means are formed as a one-piece, integral unit.

10. A storage case for protectively containing a disc therein, wherein the disc includes a central opening, an outer periphery and upper and lower surfaces, the storage case comprising:

a top cover;

a bottom cover including an inner face;

means for closing said top and bottom covers relative to one another to enclose an interior storage area of the case;

disc holder means on said inner face for releasably holding the disc within the interior storage area, said disc holder means comprising:

disc retainer means for releasably engaging the disc proximate the central opening when in a relaxed position, and said disc retainer means being operable to a compressed position to release from engagement with the disc;

release means actuated by the thumb and one other finger of the same hand of a user at actuation points radially outboard of the outer periphery of the disc for actuating said disc retainer means to said compressed position in order to release from engagement with the disc; and means for urging the disc upward relative to said inner face of said bottom cover upon operation of said release means to actuate said disc retainer means, and said means for urging the disc upward being structured and disposed to move the periphery of the disc into grasped engagement between the thumb and the one other finger of the user, thereby releasing the disc from said disc holder means and into the grasp of the user.

11. The storage case as recited in claim 10 wherein said disc retainer means comprises:

a plurality of flexible fingers extending upwardly from said inner face and terminating at barbed distal ends, said barbed distal ends each having a retaining lip for engaging the upper surface of the disc proximate the central opening when said plurality of fingers are in a relaxed position, and said plurality of fingers being structured and disposed to flex radially inward from said relaxed position to a compressed position to remove said retaining lip from the disc and to permit passage of said barbed distal ends through the central opening of the disc.

12. The storage case as recited in claim 11 wherein said release means comprises:

a pair of finger actuated tabs extending upwardly from said inner face in diametrically opposing relation to one another and said tabs being structured to receive a radially inward directed force applied by the thumb and one other finger of the same hand of a user, wherein the thumb engages a first one of said pair of tabs and the other finger engages a second one of said pair of tabs.

13. The storage case as recited in claim 12 wherein said release means further comprises:

arm members extending between each of said tabs and said plurality of fingers for transmitting the radially inward directed force to said plurality of fingers to urge said plurality of fingers to said compressed position.

14. The storage case as recited in claim 13 wherein said barbed distal ends of said plurality of flexible fingers each include an angled top surface structured and disposed to promote sliding passage of said barbed distal ends through the central opening of the disc upon attaching the disc to said disc holder means by forcing the central opening downwardly against said top angled surfaces of said barbed distal ends, thereby causing said plurality of flexible fingers to flex inwardly to said compressed position.

15. The storage case as recited in claim 14 wherein said arm members each include an outboard portion and an opposite inboard portion.

16. The storage case as recited in claim 15 further comprising a disc seat formed on said inboard portions of said arm members adjacent to said radially outboard portion of said plurality of said flexible fingers, said disc seat being structured and disposed to support the lower surface of the disc proximate to the central opening when the disc is attached to said disc holder means.

17. The storage case as recited in claim 16 wherein said means for urging the disc upward includes a sloped shoulder adjacent to said outboard portion of each of said arm members at a juncture of said arm members and each of said tabs, respectively, said sloped shoulder being structured and disposed for sliding engagement with the lower surface of the disc at the outer periphery thereof upon application of said radially inward directed force to said tabs, resulting in the outer periphery of the disc riding up said sloped shoulder adjacent to each of said tabs and into the grasp of the thumb and the one other finger of the user.

18. The storage case as recited in claim 17 further comprising a ledge formed on said outboard portion of said arm members for supporting the lower surface of the disc proximate the outer periphery when the disc is attached to said disc holder means.

* * * * *